United States Patent
Wideman et al.

(10) Patent No.: US 6,713,549 B1
(45) Date of Patent: Mar. 30, 2004

(54) SILICA REINFORCED RUBBER COMPOSITION PREPARED WITH PRE-TREATED SILICA ARTICLE OF MANUFACTURE, INCLUDING A TIRE, HAVING AT LEAST ONE COMPONENT COMPRISED OF SUCH RUBBER COMPOSITION

(75) Inventors: Lawson Gibson Wideman, Hudson, OH (US); Kevin James Pyle, Uniontown, OH (US); Richard Robinson Smith, Cuyahoga Falls, OH (US); Paul Harry Sandstrom, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 70 days.

(21) Appl. No.: 09/662,085

(22) Filed: Sep. 14, 2000

(51) Int. Cl.$^7$ .................................................. C08L 3/36
(52) U.S. Cl. .................... 524/492; 524/495; 525/331.9; 525/342; 152/209.1
(58) Field of Search .................. 525/332.6, 333.1, 525/333.2; 524/495, 492, 82, 86, 107, 155

(56) References Cited

U.S. PATENT DOCUMENTS

| | | | |
|---|---|---|---|
| 5,094,829 A | 3/1992 | Krivak et al. ................ 423/339 |
| 5,153,248 A | 10/1992 | Muse et al. ................. 524/105 |
| 5,434,206 A | 7/1995 | Wideman et al. ........... 524/241 |
| 5,504,137 A * | 4/1996 | Sandstrom et al. ......... 524/492 |
| 5,534,578 A | 7/1996 | Wideman et al. ........... 524/396 |
| 5,605,951 A | 2/1997 | Sandstrom et al. ......... 524/494 |
| 5,610,216 A * | 3/1997 | Sandstrom et al. ......... 524/381 |
| 5,679,728 A | 10/1997 | Kawazura et al. .......... 523/215 |
| 5,708,069 A | 1/1998 | Burns et al. ................ 524/483 |
| 5,719,208 A | 2/1998 | Wideman et al. ........... 523/216 |
| 5,733,963 A | 3/1998 | Sandstrom et al. ......... 524/492 |
| 5,739,211 A | 4/1998 | Wideman et al. ........... 525/375 |
| 5,750,610 A | 5/1998 | Burns et al. ................ 524/434 |
| 5,789,514 A | 8/1998 | Burns et al. .................. 528/12 |
| 5,886,074 A | 3/1999 | Sandstrom et al. ......... 524/291 |
| 5,900,467 A | 5/1999 | Wideman et al. ........... 525/349 |
| 5,914,364 A * | 6/1999 | Cohen et al. ................ 524/494 |
| 5,922,792 A | 7/1999 | Wideman et al. ........... 524/105 |
| 5,961,755 A | 10/1999 | Sandstrom et al. ......... 152/450 |
| 5,990,210 A | 11/1999 | Wideman et al. ........... 524/104 |
| 6,028,137 A * | 2/2000 | Mahmud et al. ............ 524/496 |
| 6,455,613 B1 * | 9/2002 | Zimmer et al. ............. 523/213 |
| 6,458,882 B1 * | 10/2002 | Pyle et al. ................... 524/492 |
| 6,555,609 B1 * | 4/2003 | Wideman et al. ........... 524/424 |

FOREIGN PATENT DOCUMENTS

| EP | 0933391 | 8/1999 | ............ C08K/3/26 |
|---|---|---|---|
| EP | 0941872 | 9/1999 | ............ B60C/1/00 |

OTHER PUBLICATIONS

European Search Report.

* cited by examiner

*Primary Examiner*—Peter D. Mulcahy
*Assistant Examiner*—Rip A Lee
(74) *Attorney, Agent, or Firm*—Henry C. Young, Jr.

(57) ABSTRACT

The present invention relates to a rubber composition which contains reinforcement selected from at least one of synthetic amorphous silica, carbon black and silica treated carbon black, non-alkoxysilane containing coupling agent, wherein at least one of said reinforcements is pre-treated prior to its addition to said rubber composition with at least one of an alkylsilane hydrophobating agent and/or non-alkoxysilane containing coupling agent, and to articles of manufacture, including tires, having at least one component comprised of such rubber composition.

6 Claims, No Drawings

SILICA REINFORCED RUBBER COMPOSITION PREPARED WITH PRE-TREATED SILICA ARTICLE OF MANUFACTURE, INCLUDING A TIRE, HAVING AT LEAST ONE COMPONENT COMPRISED OF SUCH RUBBER COMPOSITION

FIELD OF THE INVENTION

The present invention relates to a rubber composition which contains reinforcement selected from at least one of synthetic amorphous silica, carbon black and silica treated carbon black, non-alkoxysilane containing coupling agent, wherein at least one of said reinforcements is pre-treated prior to its addition to said rubber composition with at least one of an alkylsilane hydrophobating agent and/or non-alkoxysilane containing coupling agent, and to articles of manufacture, including tires, having at least one component comprised of such rubber composition

BACKGROUND OF THE INVENTION

For various applications utilizing rubber compositions, carbon black and/or synthetic amorphous silica-based materials are conventionally used as particulate reinforcing fillers for the elastomer(s) of the rubber composition(s).

Often a coupling agent is used together with the silica in order to couple, or otherwise enhance, its elastomer reinforcement effect for the elastomer(s) and such use of a coupling agent is well known to those having skill in such art. Such coupling agents might also be sometimes referred to as being adhesive agents insofar as use thereof to enhance reinforcement of various elastomer compositions with various silica-based materials such as, for example, aggregates of precipitated silica.

Historically, such adhesive agents are conventionally silane-based compounds which have one moiety (a silane-based moiety such as, for example, an alkoxysilane moiety) which is reactive with hydroxyl groups (e.g. silanol groups) on the surface of a synthetic amorphous silica and having another moiety (e.g. a polysulfide bridge) which becomes interactive with a conjugated diene-based elastomer.

For example, bis-(3-triethoxysilylpropyl) polysulfides having an average of from 2 to 4 connecting sulfur atoms in their polysulfidic bridge are often used as a coupling agent (or adhesive) to enhance coupling of synthetic amorphous silicas, such as aggregates of precipitated silica, to various conjugated diene-based elastomers. Use of such coupling agents is well known to those having skill in such art.

However, use of silane-containing coupling agents, or adhesives, which rely upon a reaction between the silane and hydroxyl groups (e.g. silanol groups) on the surface of a synthetic amorphous silica typically releases an alcohol as a by product of such reaction. For example, a reaction of a bis-(3-triethoxysilylpropyl) polysulfide coupling agent with silanol groups on the surface of a silica material releases ethanol as a byproduct.

For various purposes, it may be desired to reduce such alcohol evolution created by an in situ reaction of said reactants, with an associated alcohol formation, within an elastomer host during the mixing of a rubber composition which contains such reactants.

In the description of this invention, the term "phr" is used to designate parts by weight of a material per 100 parts by weight of elastomer. In the further description, the terms "rubber" and "elastomer" may be used interchangeably unless otherwise mentioned. The terms "vulcanized" and "cured" may be used interchangeably, as well as "unvulcanized" or "uncured", unless otherwise indicated.

Historically, it is also sometimes desired to homogeneously blend synthetic amorphous silica aggregates more efficiently with a rubber composition.

It is to be appreciated that such precipitated silica aggregates are, in general, hydrophilic in nature and thereby tend to agglomerate together within an unvulcanized rubber composition during the mixing thereof so that it is sometimes relatively difficult to obtain a homogeneous blend of such silica aggregates within the rubber composition without extensive mixing of the rubber and silica aggregates.

Accordingly, it has sometimes been suggested to hydrophobate such silica aggregates with an alkylsilane. Such silica hydrophobation may be accomplished, for example, by (1) mixing a hydrophobation agent with the rubber composition so that the silica aggregates are hydrophobated in situ within the elastomer host or (2) by pre-treating the silica aggregates during or after their precipitative formation prior to the introduction of the silica aggregates into the rubber composition. For example see U.S. Pat. Nos. 5,094,829; 5,708,069; 5,789,514; 5,750,610 and 5,914,364.

Accordingly, it is desired herein to provide and utilize a non alkoxysilane containing coupling agent for a synthetic amorphous silica-based material within a diene-based elastomer host which does not readily produce an alcohol as a byproduct in combination with pre-hydrophobated synthetic amorphous silica aggregates.

The term "phr" where used herein, and according to conventional practice, refers to "parts of a respective material per 100 parts by weight of rubber, or elastomer".

In the description of this invention, the terms "rubber" and "elastomer" where used herein, may be used interchangeably, unless otherwise prescribed. The terms "rubber composition", "compounded rubber" and "rubber compound", if used herein, are used interchangeably to refer to rubber which has been blended or mixed with various ingredients and materials and such terms are well known to those having skill in the rubber mixing or rubber compounding art.

A reference to an elastomer's Tg, if used herein, refers to its glass transition temperature, which can conveniently be determined by a differential scanning calorimeter at a heating rate of 10° C. per minute.

SUMMARY AND PRACTICE OF THE INVENTION

In accordance with this invention, a rubber composition is provided which comprises, based upon parts by weight per 100 parts by weight elastomer (phr):

(A) 100 parts by weight of at least one diene-based elastomer, (B) about 25 to about 100, optionally about 35 to about 90, phr of particulate reinforcing filler comprised of about 25 to about 100, alternately about 10 to about 70, phr of synthetic amorphous silica aggregates and, correspondingly, from zero to about 75, alternately about 10 to about 60 phr of at least one of carbon black and silica treated carbon black having domains of silica on its surface; wherein said silica aggregates and said silica domains on the surface of said treated carbon black contain hydroxyl groups (e.g. silanol groups) on their surface; and (C) about 0.5 to about 10, alternately about 1 to about 7, phr of a coupling agent selected from at least one of:
(1) carboxymaleimidophenyl ester, (U.S. Pat. No. 5,990,210)
(2) 2,2' dithiosalicylic acid, disodium salt, (U.S. Pat. No. 5,961,755)
(3) bis-succinimide polysulfide, (U.S. Pat. No. 5,922,792)
(4) 2-benzothiazyl-3-(propane-1,2-diol), (U.S. Pat. No. 5,900,467)
(5) o-salicylsalicylic acid, (U.S. Pat. No. 5,886,074)
(6) pyrazine amide, (U.S. Pat. No. 5,739,211)
(7) 3,3'-tetrathiodipropanol, (U.S. Pat. No. 5,733,963)
(8) hydroxyethyl-phenoxyacetic acid, (U.S. Pat. No. 5,719,208)
(9) 3,3'tetrathiodipropionamide, (U.S. Pat. No. 5,641,820)
(10) poly-(2-propanol-1,3-polysulfide), (U.S. Pat. No. 5,610,216)
(11) 3,3'-tetrathiodipropionitrile, (U.S. Pat. No. 5,605,951)
(12) Nicotinamide, (U.S. Pat. No. 5,504,137)
(13) zinc and sodium salts of salicylic acid, (U.S. Pat. No. 5,534,578)
(14) diaminodirosinate salts, (U.S. Pat. No. 5,434,206), and
(15) bisaniline PD bismaleimide, (U.S. Pat. No. 5,153,248);

wherein said coupling agent is mixed with at least one of said elastomers according to one or more of the following:
(1) mixing at least one of said coupling agents with said elastomer(s) with said particulate reinforcement, preferably in an internal rubber mixer, wherein said coupling agent(s) has been pre-reacted with carbon black to form a carbon black composite thereof,
(2) mixing at least one of said coupling agents with said elastomer(s) and said particulate reinforcement, preferably in an internal rubber mixer, wherein said coupling agent(s) has been pre-reacted with said silica treated carbon black to form a silica treated carbon back composite thereof,
(3) mixing at least one of said coupling agents with said elastomer(s) and said particulate reinforcement, preferably in an internal rubber mixer, wherein said coupling agent(s) has been pre-reacted with
  (a) a synthetic precipitated silica or
  (b) an aqueous dispersion of colloidal silica particles from which a precipitated silica is recovered to form a silica composite thereof,
(4) mixing at least one of said coupling agents and particulate reinforcement with said elastomer(s), preferably in an internal rubber mixer, wherein said particulate reinforcement includes at least one of pre-hydrophobated synthetic precipitated silica aggregates and pre-hydrophobated silica treated carbon black, wherein said silica and carbon black has been pre-hydrophobated prior to mixing with said elastomers with an alkylsilane of the general formula (I):

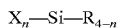    (I)

wherein X is a radical selected from alkoxy radicals having from 1 through 3 carbon atoms, preferably selected from methoxy and ethoxy radicals, and from halogen radicals selected from at least one of chlorine and bromine radicals, preferably a chlorine radical; R is an alkyl radical having from 1 to 18 carbon atoms, preferably from 1 through 4 carbon atoms and more preferably selected from methyl and ethyl groups; and n is an integer of 1 through 3, or
(5) mixing at least one of said coupling agents and said alkylsilane of Formula (I) with said elastomer(s) and said particulate reinforcement, preferably in an internal rubber mixer, wherein said coupling agent(s) and said alkylsilane of Formula (I) have all been pre-reacted, prior to addition to said elastomer(s), with
  (a) a synthetic precipitated silica or
  (b) an aqueous dispersion of colloidal silica particles from a which a precipitated silica is recovered to form a silica composition thereof.

In further accordance with this invention, an article of manufacture is provided which contains at least one component comprised of the rubber composition of this invention.

In additional accordance with this invention, a tire is provided which contains at least one component comprised of the rubber composition of this invention.

In further accordance with this invention, a tire is provided having a tread comprised of the rubber composition of this invention.

A significant aspect of this invention for the use of said coupling agents is that the reaction thereof with the hydroxyl groups on the surface of the silica and/or surface of the silica of the silica treated carbon black (e.g. silanol groups) does not produce an alcohol as a byproduct.

In addition, it is contemplated that the non-silane coupling agent of this invention can be used in combination with a reduced amount of a conventional alkoxysilane polysulfide coupling agent ((e.g. a bis (3-triethoxysilylpropyl) disulfide or tetrasulfide)) to reduce an evolution of an alcohol byproduct during the reaction thereof with hydroxyl groups (e.g. silanol groups) on the surface of a silica in the manufacture of rubber products.

The silica treated carbon black relates to carbon black which contains domains of exposed silica on the surface of the carbon black. Such carbon black may be prepared, for example, by reaction of an alkyl silane (e.g. an alkoxy silane) with carbon black or by co-fuming carbon black and silica at an elevated temperature. For example, see U.S. Pat. Nos. 5,679,728 and 6,028,137.

In one aspect of the practice of this invention, the silica, particularly precipitated silica aggregates, may reacted with, particularly pre-reacted with, the alkylsilane of formula (1), which might be considered herein as a hydrophobating agent for the silica, to hydrophobate, particularly to pre-hydrophobate, the silica. In one aspect, it is contemplated herein that the silica may be pre-hydrophobated, for example, by treating silica in an aqueous colloidal form thereof with said alkylsilane of formula (I).

In practice, it is contemplated that the pre-hydrophobation of the silica may be accomplished by treating the precipitated silica in a recovered state or by treating colloidal precipitated silica prior to recovery of the precipitated silica.

For example precipitated silica aggregates might be recovered, for example, from colloidal silica, for example by treating a silica hydrosol, and with the aid of acid addition to the treated colloidal silica (for example, sulfuric acid or hydrochloric acid) followed by water washing and drying the recovered hydrophobated silica as a hydrophobated silica gel or as a hydrophobated precipitated silica. While this invention is not intended to be directed to a specific preparation technique (preparation of silica hydrosols, recovery of silica gels and precipitated silicas, etc.) of the pre-hydrophobated precipitated silica itself, for education purposes in this regard, reference might be made to the aforesaid Condensed Chemical Dictionary and U.S. Pat. No. 5,094,829 as well as U.S. Pat. Nos. 5,708,069, 5,789,514 and 5,750,610 for a more detailed discussion.

Representative contemplated alkylsilanes of Formula (I) are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

In one aspect of the invention, the particulate reinforcement for the rubber composition be said pre-treated precipitated silica aggregates or may be combination of said pre-treated precipitated silica aggregates and reinforcing carbon black.

The rubber composition may contain a minor amount of the pre-treated precipitated silica aggregates insofar as the silica and carbon black reinforcement is concerned or it may be quantitatively reinforced with such silica aggregates where carbon black is present in a minor amount insofar as the silica and carbon black reinforcement is concerned.

Where it is desired that the rubber composition is primarily reinforced with silica as the reinforcing pigment, it is preferable that the weight ratio of silica to carbon black is at least 3/1, preferably at least 10/1 and, thus, for example, in a range of about 3/1 to about 30/1.

In one aspect, such a rubber composition can be provided as being sulfur cured. The sulfur curing is accomplished in a conventional manner, namely, by curing under conditions of elevated temperature and pressure for a suitable period of time.

The synthetic amorphous silica may be selected from aggregates of precipitated silica, which is intended to include precipitated aluminosilicates as a co-precipitated silica and aluminum, and from fumed (pyrogenically formed) silica.

Such precipitated silica is, in general, well known to those having skill in such art. For example, such precipitated silica may be precipitated by controlled addition of an acid such as, for example, hydrochloric acid or sulfuric acid, to a basic solution (e.g. sodium hydroxide) of a silicate, for example, sodium silicate, usually in the presence of an electrolyte, for example, sodium sulfate. Primary, colloidal silica particles typically form during such process which quickly coalesce to form aggregates of such primary particles and which are then recovered as precipitates by filtering, washing the resulting filter cake with water or an aqueous solution, and drying the recovered precipitated silica. Such method of preparing precipitated silica, and variations thereof, are well known to those having skill in such art.

The silica treated carbon black relates to carbon black which contains domains of exposed silica on the surface of the carbon black. Such carbon black may be prepared, for example, by reaction of an alkyl silane (e.g. an alkoxy silane) with carbon black or by co-fuming carbon black and silica at an elevated temperature. For example, see U.S. Pat. Nos. 5,679,728 and 6,028,137.

In practice, various diene-based elastomers may be used for the tire tread such as, for example, homopolymers and copolymers of monomers selected from isoprene and 1,3-butadiene and copolymers of at least one diene selected from isoprene and 1,3-butadiene and a vinyl aromatic compound selected from styrene and alphamethyl styrene, preferably styrene.

Representative of such conjugated diene-based elastomers are, for example, cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers.

In the further practice of this invention, particulate reinforcement for the rubber composition may be particulate synthetic amorphous silica, or a combination of carbon black and amorphous silica (exclusive of silica treated carbon black), usually of an amount in a range of about 25 to about 100, alternately about 35 to about 90, phr. If a combination of such carbon black and silica is used, usually at least about 5 phr of carbon black and at least 10 phr of silica are used. For example, a weight ratio of silica to carbon black ranging from about 1/5 to 5/1 might be used.

Commonly employed synthetic amorphous silica, or siliceous pigments, used in rubber compounding applications can be used as the silica in this invention, including precipitated siliceous pigments and fumed (pyrogenic) silica wherein aggregates of precipitated silicas are usually preferred.

The precipitated silica aggregates preferably employed in this invention are precipitated silicas such as, for example, those obtained by the acidification of a soluble silicate, e.g., sodium silicate and may include co-precipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 cm3/100 g, and more usually about 100 to about 300 $cm^3/100$ g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from Degussa AG with, for example, designations VN2 and VN3, as well as other grades of silica, particularly precipitated silicas, which can be used for elastomer reinforcement.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily directed to the utilization of a non-alkoxysilane containing specified coupling agent(s), in a rubber composition without an alcohol byproduct.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, and fillers such as silica and silica treated carbon black and adhesive agent, are mixed in one or more non-productive mix stages. The terms "non-productive" and "productive" mix stages are well known to those having skill in the rubber mixing art.

While various embodiments are disclosed herein for practicing the invention, it will be apparent to those skilled in this art that various changes and modifications may be made therein without departing from the spirit or scope of the invention.

What is claimed is:

1. A tire which contains at least one component comprised of a rubber composition which comprises
   (A) 100 parts by weight of at least one diene-based elastomer,
   (B) about 25 to about 100 phr of particulate reinforcing filler comprised of
      (1) about 25 to about 100 phr of a preformed hydrophobated silica composite of synthetic amorphous silica aggregates and coupling agent and, correspondingly,
      (2) from zero to about 75 phr of carbon black;
   wherein said synthetic amorphous silica aggregates for said preformed silica composite are of a precipitated silica and contain hydroxyl groups on their surface; and
   (C) said coupling agent for said preformed silica composite is selected from at least one of the group consisting of:
      (1) carboxymaleimidophenyl ester,
      (2) disodium salt of 2,2'dithiosalicylic acid,
      (3) bis-succinimide polysulfide,
      (4) 2-benzothiazyl-3-(propane-1,2-diol),
      (5) o-salicylsalicylic acid,
      (6) pyrazine amide,
      (7) 3,3'-tetrathiodipropanol,
      (8) hydroxyethyl-phenoxyacetic acid,
      (9) 3,3'tetrathiodipropionamide,
      (10) poly-(2-propanol-1,3-polysulfide),
      (11) 3,3'-tetrathiodipropionitrile,
      (12) nicotinamide,
      (13) zinc and sodium salts of salicylic acid,
      (14) diaminodirosinate salts, and
      (15) bisaniline PD bismaleimide,
   wherein said preformed hydrophobated silica composite is prepared prior to being mixed with said elastomer, and wherein said pre-formed silica composite is prepared by pre-reacting said coupling agent with
      (1) said synthetic amorphous silica aggregates, or
      (2) an aqueous dispersion of colloidal silica particles from which the precipitated silica is recovered to form said pre-formed silica composite, wherein said preformed silica composite is hydrophobated by:
         A. reacting said preformed silica composite with an alkylsilane of general formula (I):

$$X_n\text{—Si—}R_{4-n} \tag{I}$$

wherein X is a radical selected from the group consisting of alkoxy radicals having from 1 through 3 carbon atoms, chlorine radicals and bromine radicals; R is an alkyl radical having from 1 to 18 carbon atoms; and n is an integer of 1 through 3, or by
         B. reacting said precipitated silica with a combination of said coupling agent and said alkylsilane of said general formula (I).

2. The tire of claim 1 wherein said preformed silica composite is prepared by reacting said precipitated silica with said coupling agent and said preformed silica composite is hydrophobated by reacting with said alkylsilane of said general formula (I).

3. The tire of claim 2 wherein said component is a tread.

4. The tire of claim 1 wherein said diene-based elastomer(s) is comprised of at least one of natural and/or synthetic cis 1,4-polyisoprene, cis 1,4-polybutadiene, styrene/butadiene copolymers prepared by aqueous emulsion polymerization or by organic solvent solution polymerization prepared, medium vinyl polybutadiene having a vinyl 1,2-content in a range of about 15 to about 90 percent, isoprene/butadiene copolymers, styrene/isoprene/butadiene terpolymers and tin coupled elastomers selected from at least one of tin coupled organic solution prepared styrene/butadiene co-polymers, isoprene/butadiene copolymers, styrene/isoprene copolymers, polybutadiene and styrene/isoprene/butadiene terpolymers.

5. The tire of claim 4 wherein said component is a tread.

6. The tire of claim 1 where said component is a tread.

* * * * *